United States Patent
Courbon et al.

(10) Patent No.: US 8,720,845 B2
(45) Date of Patent: May 13, 2014

(54) WEAR COMPENSATOR FOR A PIVOTING DETENT JOINT

(75) Inventors: Emmanuel Courbon, Columbia, SC (US); Andreas Enz, Columbia, SC (US); Ramesh Noone, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 279 days.

(21) Appl. No.: 13/275,828

(22) Filed: Oct. 18, 2011

(65) Prior Publication Data
US 2013/0092812 A1    Apr. 18, 2013

(51) Int. Cl.
  *B60R 1/06*    (2006.01)
  *E05D 11/08*   (2006.01)
(52) U.S. Cl.
  USPC ........ 248/479; 248/475.1; 359/871; 359/872; 16/343
(58) Field of Classification Search
  USPC ......... 248/476, 477, 478, 479, 289.11, 475.1, 248/483, 484, 900; 379/841, 872, 873, 877, 379/879, 838, 871; 16/321, 333, 342, 343
  See application file for complete search history.

(56) References Cited

U.S. PATENT DOCUMENTS

| | | | |
|---|---|---|---|
| 4,101,227 A | | 7/1978 | Herbenar et al. |
| 4,186,905 A | * | 2/1980 | Brudy ........................... 248/478 |
| 4,645,316 A | * | 2/1987 | Ohyama ....................... 248/481 |
| 4,824,065 A | | 4/1989 | Manzoni |
| 5,120,015 A | * | 6/1992 | do Espirito Santo ......... 248/479 |
| 6,590,725 B2 | | 7/2003 | Kho |
| 7,137,715 B2 | | 11/2006 | Schuurmans et al. |
| 7,261,272 B2 | * | 8/2007 | Courbon ...................... 248/475.1 |
| 7,399,137 B2 | | 7/2008 | Schuurmans |
| 7,445,191 B2 | | 11/2008 | Courbon |
| 7,452,088 B2 | * | 11/2008 | Brester et al. ................. 359/841 |
| 7,490,946 B1 | | 2/2009 | Foote et al. |
| 7,546,997 B2 | | 6/2009 | Van Stiphout |
| 7,735,196 B2 | | 6/2010 | Centmayer et al. |
| 8,152,124 B2 | * | 4/2012 | Branham .................... 248/475.1 |
| 8,209,816 B2 | * | 7/2012 | Heger et al. ...................... 16/334 |
| 2013/0092812 A1 | * | 4/2013 | Courbon et al. .............. 248/478 |

FOREIGN PATENT DOCUMENTS

GB    2374578    * 10/2002

* cited by examiner

*Primary Examiner* — Tan Le
(74) *Attorney, Agent, or Firm* — McNair Law Firm, P.A.; Seann P. Lahey

(57) ABSTRACT

A wear compensator for a pivoting detent joint comprising a carrier base having a bearing housing and a bearing ring disposed in an interior channel of the bearing housing. A pivot cylinder is carried in the interior channel bearing against the bearing ring. An inner cone slidably carried in a cylinder recess of the pivot cylinder. A biasing element forcing the inner cone into the cylinder recess to biases the cylinder wall against the bearing ring. A support arm pivotally mounted to the bearing housing including a lower pivot block receiving and supporting the pivot cylinder in the interior channel, and an upper pivot block having an arm detent ring engaging a base detent ring carried by the bearing housing. Accordingly, the pivot cylinder rotates on the bearing ring and the arm detent ring rotates on the base detent ring to adjust the position of the support arm.

20 Claims, 9 Drawing Sheets

WEAR COMPENSATOR FOR A PIVOTING DETENT JOINT

BACKGROUND OF THE INVENTION

1) Field of the Invention

The present invention relates to vehicle mirror assemblies, and more particularly, to a pivoting detent joint for an exterior vehicle rearview mirror that includes a wear compensator to maintain proper rotational resistance of the support arm on the carrier base to prevent unwanted movement of the mirror assembly.

2) Description of Related Art

Rearview mirror assemblies for vehicles, particularly for commercial trucks, exist in a wide variety of shapes and sizes. These various mirror assemblies include many different arrangements for mounting the mirror assemblies on the vehicles. On large, commercial vehicles, such as trucks and buses, a mirror head which contains the actual mirrors is mounted on a support arm that extends the mirror head out from the side of the vehicle, thereby providing a clear view of different areas around the vehicle. A typical mounting arrangement includes the mirror head carried by the support arm which is mounted to a carrier base affixed to the vehicle body.

A pivot joint may be included in the support arm and carrier base assembly to make it possible to swivel the support arm to position the mirror head at a preferred viewing position, and to move the mirror head from an operational position into a storage position essentially folded alongside the vehicle. The pivot joints are typically designed using a detent arrangement to hold the support arm in one of several operational or storage positions. However, the pivot joint and detent systems known in the prior art can suffer from significant wear issues that loosen the joint and detent resistance to secure the support arm in a desired position, eventually leading to a loose, shaky and unusable mirror assembly that can fail completely.

A substantial problem with external vehicle rearview mirrors, particularly in the case of commercial vehicles, is the occurrence of vibration. First, vibration can negatively affect the use of the mirror, and second, vibration of the mirror can lead to damage due to fatigue for nearly every component in the mirror assembly. Over time, wear caused by wind and road vibrations can loosen the pivot joint connections between the support arm and carrier base. In many cases, after only minimal wear has occurred on a large mirror assembly for a commercial vehicle, excessive mirror shaking can develop in the assembly that significantly reduces the effective use of the mirror and the ability of the support arm to hold the mirror head in a desired position.

Accordingly, it is an object of the present invention to provide a pivoting detent joint for a mirror assembly with wear compensation to resist loosening of the connection between components due to wear from wind and road vibrations.

SUMMARY OF THE INVENTION

The above objective is accomplished according to the present invention by providing a pivoting detent joint for a mirror assembly having a wear compensator, comprising a carrier base for mounting to the vehicle; a bearing housing included on the carrier base; a bearing ring disposed in an interior channel of the bearing housing; a pivot cylinder rotatably carried in the interior channel and having a cylinder wall bearing against the bearing ring; an inner cone slidably carried in a cylinder recess of the pivot cylinder; a biasing element disposed in the bearing housing biasing the inner cone into the cylinder recess so that the inner cone biases the cylinder wall against the bearing ring; and, a support arm for carrying a mirror head being pivotally mounted to the bearing housing, wherein the support arm includes a lower pivot block receiving and supporting the pivot cylinder in the interior channel, and an upper pivot block having an arm detent ring engaging a base detent ring carried by the bearing housing; whereby rotation of the support arm causes rotation of the pivot cylinder on the bearing ring and the arm detent ring on the base detent ring to adjust the position of the support arm relative to the carrier base.

In a further embodiment, the bearing ring comprises a flanged sleeve bushing and the bearing housing includes a flange recess receiving the flange of the sleeve bushing generally at a distal end of the interior channel for positioning the sleeve bushing in the interior channel.

In a further embodiment, the biasing element comprises a coil spring.

In a further embodiment, a spring sleeve is carried in the interior channel of the bearing housing, wherein the coil spring is disposed in the spring sleeve and has a first spring end biases against the spring sleeve and a second spring end biased against the inner cone.

In a further embodiment, the spring sleeve includes a wiring harness mount adapted for interconnecting with a wiring harness to support electrical wires routed through the carrier base.

In a further embodiment, the spring sleeve includes at least one prong extending from a top side of the spring sleeve, and wherein the prong engages a complementary prong recess in an upper flange within the interior channel of the bearing housing to resist rotation of the spring sleeve within the interior channel.

In a further embodiment, a continuous wiring passage extends through the carrier base and into the support arm defined by a primary opening disposed in the carrier base extending into the interior channel of the bearing housing, a wiring gap disposed between a bottom side of the base detent ring and the spring sleeve, a base detent ring opening, an arm detent ring opening, and a support arm interior channel to receive electrical wiring for the mirror head.

In a further embodiment, the base detent ring includes a mounting flange disposed generally around a perimeter of the base detent ring, and wherein the bearing housing includes a mounting flange recess receiving the mounting flange generally at a distal end of the interior channel for positioning the base detent ring on the bearing housing.

In a further embodiment, a connecting block projecting from a bottom side of the base detent ring is received into a complementary block receiving channel in an upper flange of the interior channel for interconnecting the base detent ring and the bearing housing.

In a further embodiment, the arm detent ring and the base detent ring are defined by a series of cooperating grooves and ridges that interlock to position the support arm relative to the carrier base.

In a further embodiment, a first cylinder wall portion of the pivot cylinder is carried on a first flexible arm, wherein the inner cone biases the first cylinder wall portion and the first flexible arm outwardly to force the first cylinder wall portion against the bearing ring to compensate for wear of the pivot cylinder against the bearing ring.

In a further embodiment, a second cylinder wall portion of the pivot cylinder is carried on a second flexible arm, wherein the first and second cylinder wall portions define approximately a first half of the circumference of the pivot cylinder, and the remaining second half comprises a rigid cylinder wall portion engaging the bearing ring.

In a further embodiment, the inner cone includes an indexing slot receiving the first flexible arm when inserted into the cylinder recess to align and resist rotation of the inner cone in the pivot cylinder.

In a further embodiment, the lower pivot block of the support arm includes a guide post and the pivot cylinder includes a guide channel receiving the guide post.

In a further embodiment, the pivot cylinder includes an indexing block projecting from a side of the pivot cylinder, wherein the indexing block is received into an indexing slot of the lower pivot block on support arm so that rotation of support arm causes rotation of pivot cylinder on the bearing ring and resists rotation of the pivot cylinder on the lower pivot block.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. These and other objects and features of the invention will become more fully apparent when the following detailed description is read in conjunction with the accompanying figures. However, it is to be understood that both the foregoing summary of the invention and the following detailed description are not restrictive of the invention or other alternate embodiments of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below.

DETAILED DESCRIPTION OF A PREFERRED EMBODIMENT

Figure 1:
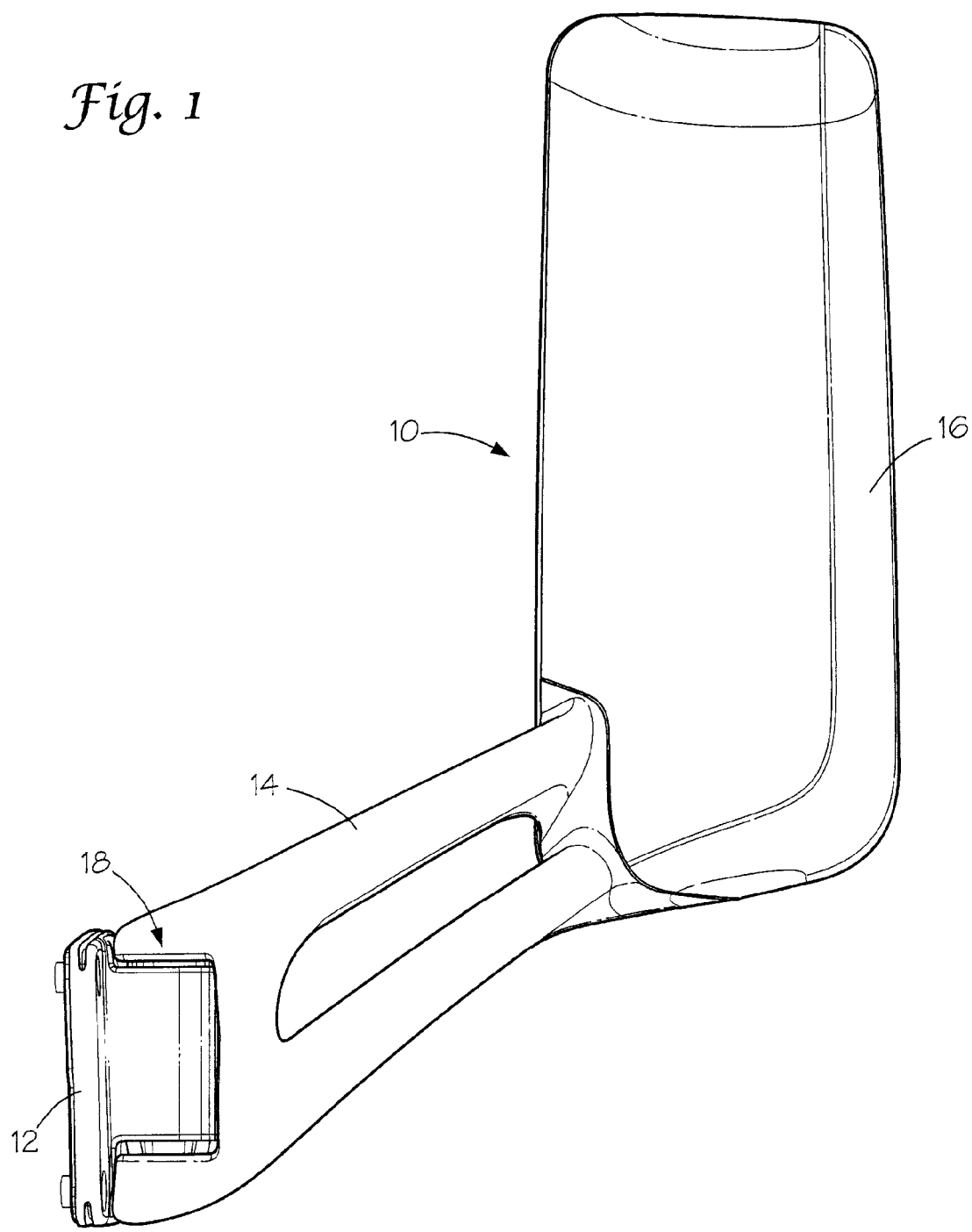
FIG. 1 shows a perspective view of a mirror assembly according to the present invention.

With reference to the drawings, the invention will now be described in more detail. Referring to FIG. 1, a vehicle mirror assembly, designated generally as 10, is shown having a carrier base 12, a support arm 14 pivotally mounted to carrier base 12, and a mirror head 16 carried by support arm 14. A pivoting detent joint, designated generally as 18, interconnects carrier base 12 and support arm 14 and includes a wear compensator as described herein below.

Figure 2:
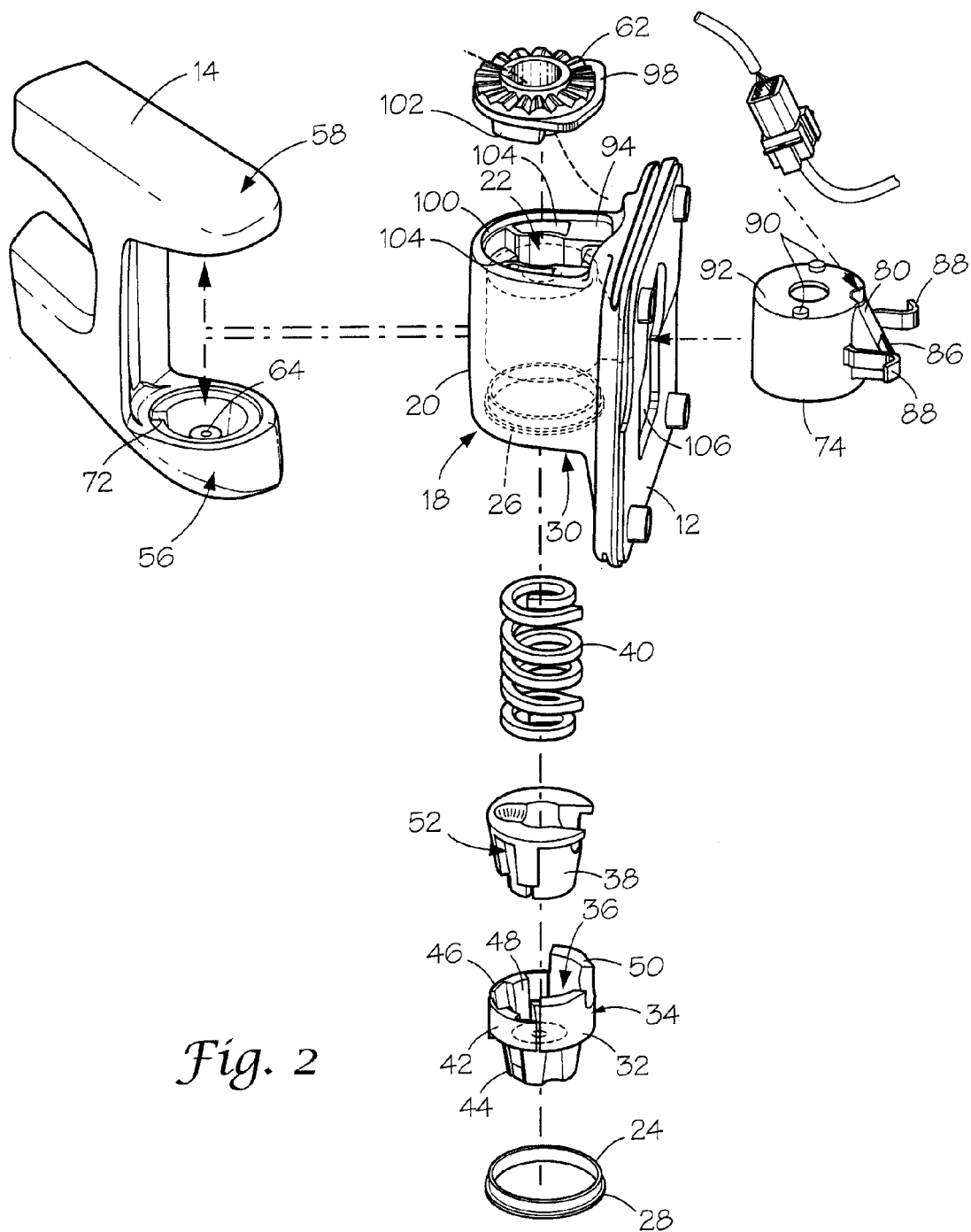
FIG. 2 shows an exploded view of the pivot joint wear compensator according to the present invention.
Figure 3:
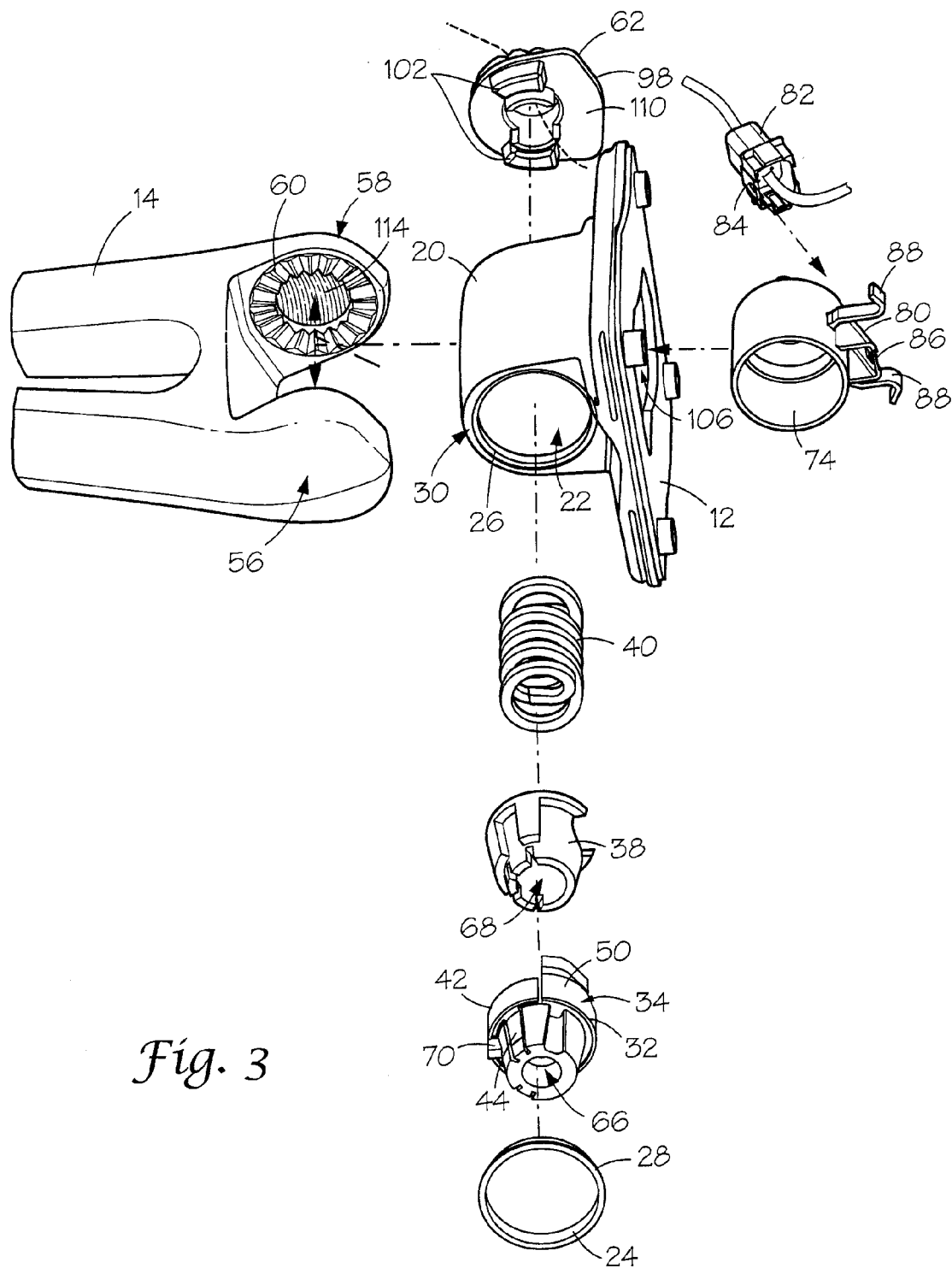
FIG. 3 shows an alternative exploded view of the pivot joint wear compensator according to the present invention.
Figure 14:
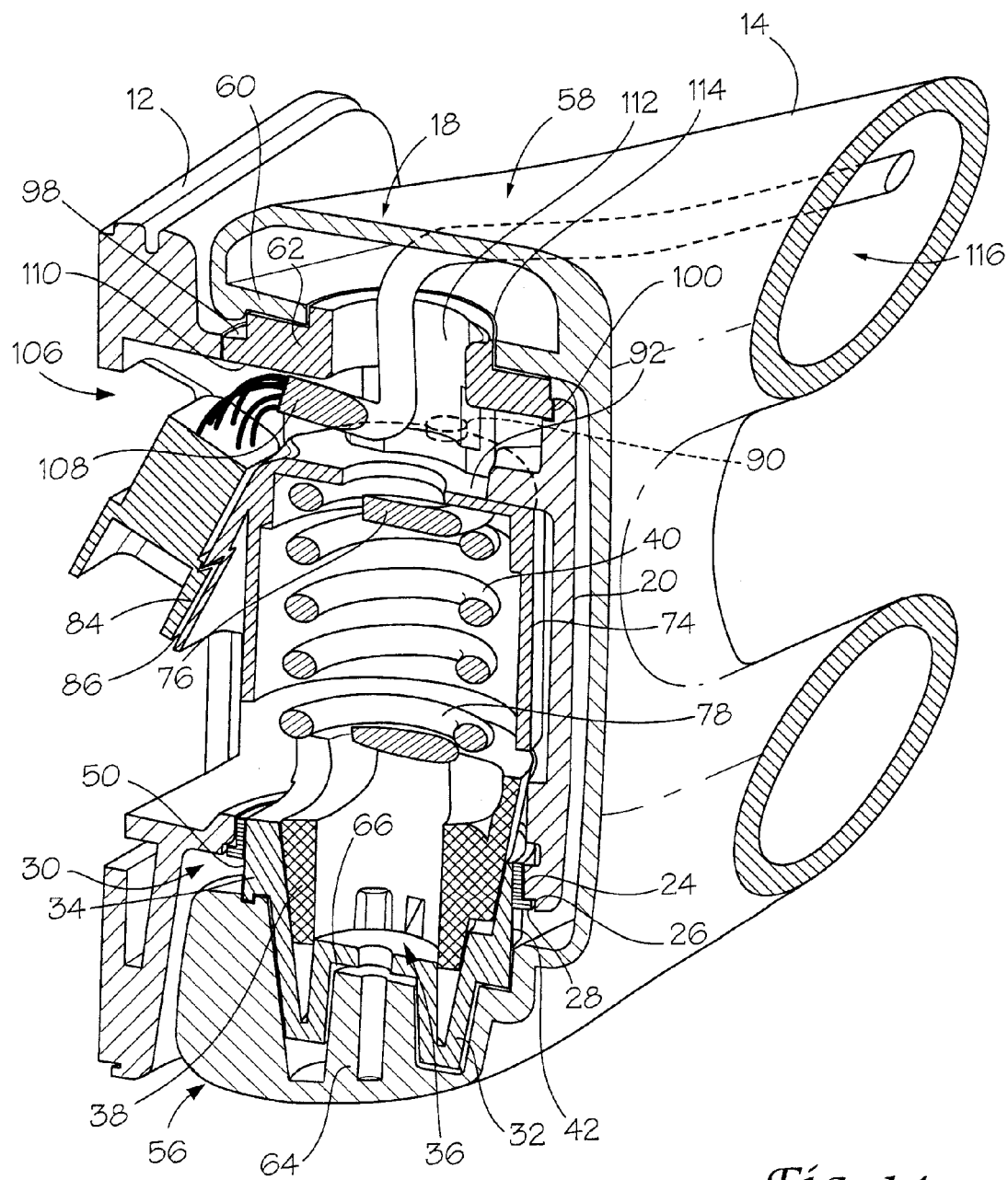
FIG. 14 shows a cross-section view of the pivoting detent joint according to the present invention; and, FIG. 15 shows an exploded view of the spring sleeve interconnecting with an upper flange within the interior channel of the bearing housing according to the present invention.

Referring to FIGS. 2, 3, and 14, in the illustrated embodiment, carrier base 12 is adapted for mounting to the exterior of a vehicle. A bearing housing 20 is included on the carrier base that extends laterally and defines a hollow interior channel, designated generally as 22. A bearing ring 24 is carried in interior channel 22 of bearing housing 20. In one embodiment, bearing ring 24 comprises a flanged sleeve bushing. Bearing housing 20 further includes a flange recess 26 for receiving the flange 28 of the sleeve bushing 24 generally at a distal end 30 of interior channel 22 for positioning sleeve bushing 24 in interior channel 22.

Figure 5:
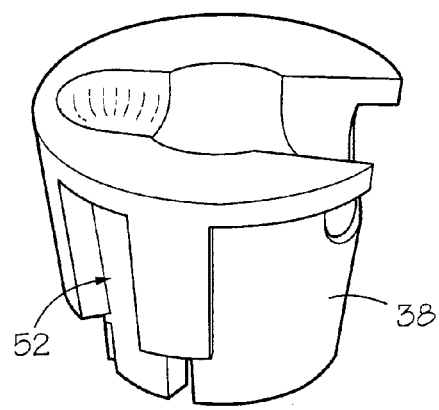
FIG. 5 shows an upper perspective view of the inner cone according to the present invention.
Figure 7:
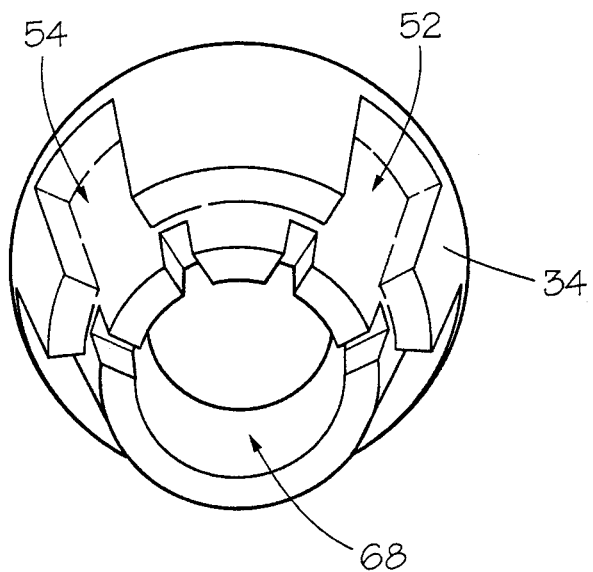
FIG. 7 shows a lower perspective view of the inner cone according to the present invention.

A pivot cylinder 32 is rotatably carried in interior channel 22 and is constructed and arranged so that a cylinder wall, designated generally as 34, of pivot cylinder 32 contacts and is biased against bearing ring 24. Pivot cylinder 32 further includes a cylinder recess, designated generally as 36, defining a generally hollow interior portion of the pivot cylinder 32. An inner cone 38 is slidably carried in cylinder recess 36 of pivot cylinder 32 so that inner cone 38 moves vertically in cylinder recess 36. With further reference to FIGS. 5 and 7, inner cone 38 is tapered to provide a generally cone shaped exterior arrangement so that as it moves downward into cylinder recess 36 it forces cylinder wall 34 outwardly against bearing ring 24.

Figure 4:
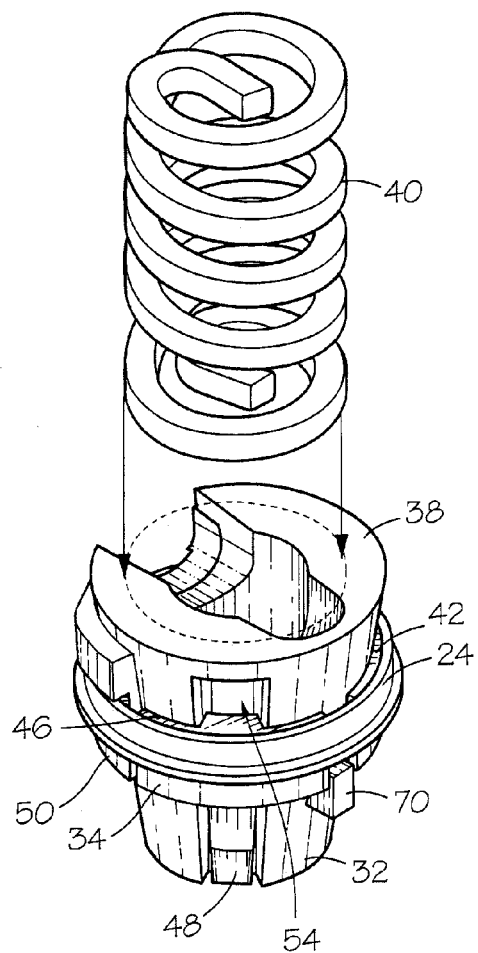
FIG. 4 shows a detailed perspective view of the cooperation between the biasing element, pivot cylinder, bearing ring and the inner cone according to the present invention.
Figure 6:
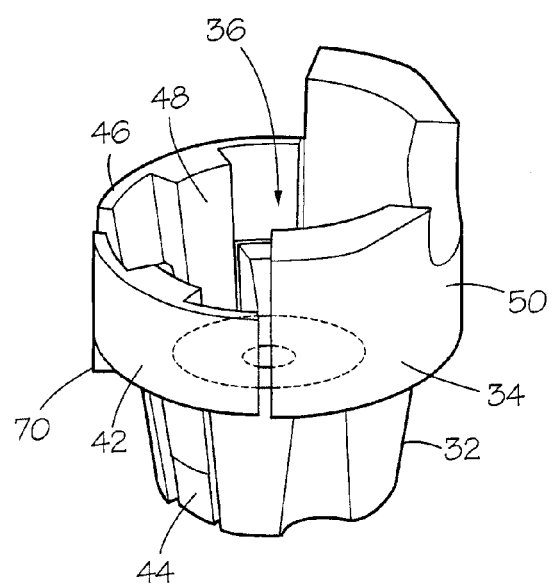
FIG. 6 shows an upper perspective view of the pivot cylinder according to the present invention.
Figure 13:
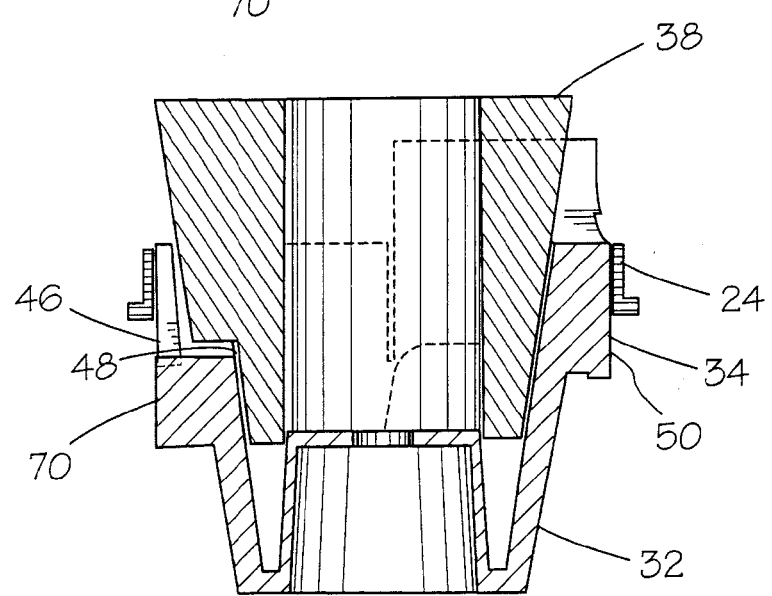
FIG. 13 shows a cross-section view of the pivot cylinder, bearing ring and the inner cone arrangement according to the present invention.

With further reference to FIGS. 4 and 13, a biasing element 40 is disposed in bearing housing 20 that biases inner cone 38 into cylinder recess 36 so that inner cone 38 presses against the interior walls of cylinder recess 36 and biases the exterior side of cylinder wall 34 against bearing ring 24 to create and maintain rotational resistance as the components wear against each other. In the illustrated embodiment, biasing element 40 comprises a coil spring. Alternatively, biasing element 40 may be any element suitable for maintaining a compression force against inner cone 38 within bearing housing 20 as would be known to those skilled in the art.

With further reference to FIGS. 6, 8, 10, and 12 the pivot cylinder includes a first cylinder wall portion 42 carried on a first flexible arm 44. In operation, inner cone 38 is forced by coil spring 40 into cylinder recess 36 and biases first cylinder wall portion 42 and first flexible arm 44 outwardly to force first cylinder wall portion 42 against bearing ring 24 to compensate for wear of the pivot cylinder against the bearing ring. In the preferred illustrated embodiment, pivot cylinder 32 further includes a second cylinder wall portion 46 carried on a second flexible arm 48. Thus, first and second cylinder wall portions 42 and 46 define approximately a first half of the circumference of cylinder wall 34 of pivot cylinder 32. The remaining second half comprises a rigid cylinder wall portion 50 engaging bearing ring 24. Accordingly, as cylinder wall 34 and bearing ring 24 wear against each other, a loosening of the connection is prevented as inner cone 38 continually biases cylinder wall portions 42, 46 and 50 against bearing ring 24 to accommodate for the wear between components and maintain a stable and desires rotational resistance.

Figure 9:
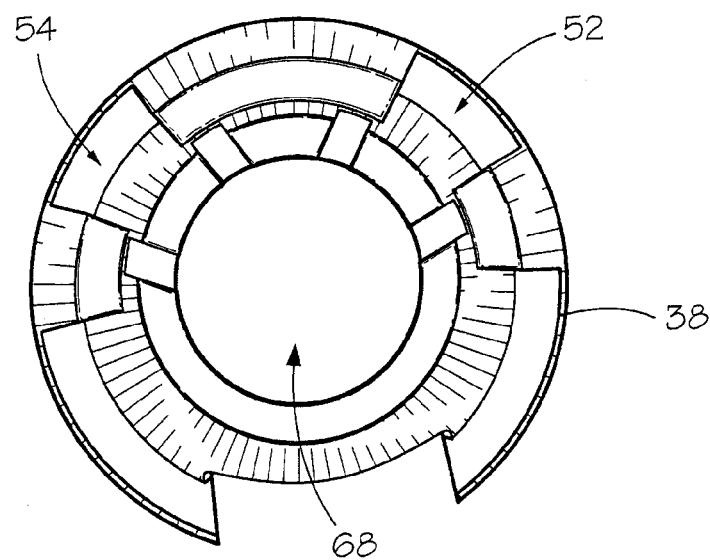
FIG. 9 shows a bottom view of the inner cone according to the present invention.

With further reference to FIGS. 5, 7, and 9, in the illustrated embodiment, inner cone 38 includes an indexing slot 52 receiving first flexible arm 44 when inserted into cylinder recess 36 to align and resist rotation of inner cone 38 in pivot cylinder 32. As shown in the illustrated embodiment, a second indexing slot 54 is also provided on inner cone 38 for receiving second flexible arm 48 when inserted into cylinder recess 36 to align and resist rotation of inner cone 38 in pivot cylinder 32. Indexing slots 52 and 54 follow the cone shaped taper of inner cone 38 to force first and second flexible arms 44 and 48, respectively, outwardly to further bias cylinder wall portions 42 and 46 against bearing ring 24.

Referring to FIGS. 2, 3 and 14, in the illustrated embodiment, support arm 14 includes a lower pivot block, designated generally as 56, receiving and supporting pivot cylinder 32 in interior channel 22. Support arm 14 further includes an upper pivot block 58 having an arm detent ring 60 engaging a base detent ring 62 carried by bearing housing 20. Accordingly, upper and lower pivot blocks 56 and 58 are carried at opposite distal ends of interior channel 22 of bearing housing 20. In operation, rotation of support arm 14 causes rotation of pivot cylinder 32 on bearing ring 24 and arm detent ring 60 on base detent ring 62 to adjust the position of support arm 14 relative to carrier base 12. The force of biasing element 40 directs pivot cylinder 32 into lower pivot block 56, which then draws arm detent ring 60 on upper pivot block 58 against base detent ring 62 at the opposing distal end of bearing housing 20. In the illustrated embodiment, arm detent ring 60 and base detent ring 62 are defined by a series of cooperating grooves and ridges that interlock to position support arm 14 relative to carrier base 12 on bearing housing 20.

Figure 8:
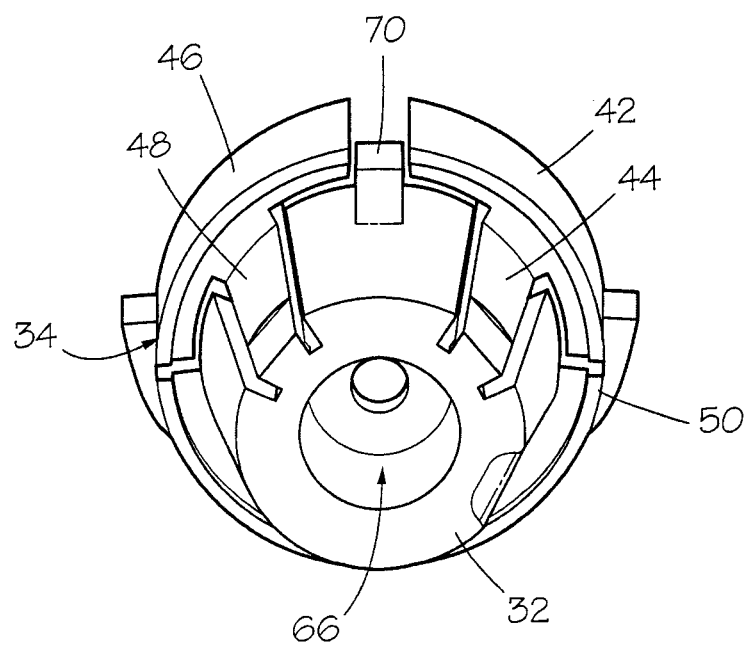
FIG. 8 shows a lower perspective view of the pivot cylinder according to the present invention.

As best shown in FIGS. 2 and 14, lower pivot block 56 of support arm 14 includes a guide post 64. As best shown in FIGS. 8, 13 and 14, pivot cylinder 32 includes a guide channel, designated generally as 66, receiving guide post 64 to position and interconnect pivot cylinder 32 in lower pivot block 56. The walls that define guide channel 66 extend into cylinder recess 36 of pivot cylinder 32. As best shown in FIGS. 7, 13, and 14, to accommodate guide channel 66 protruding upward into cylinder recess 36, inner cone 38 includes a bottom opening 68 that receives the walls defining guide channel 66. This allows inner cone 38 more vertical movement within cylinder recess 36 to maintain biases of cylinder wall 34 against bearing ring 24.

Figure 10:
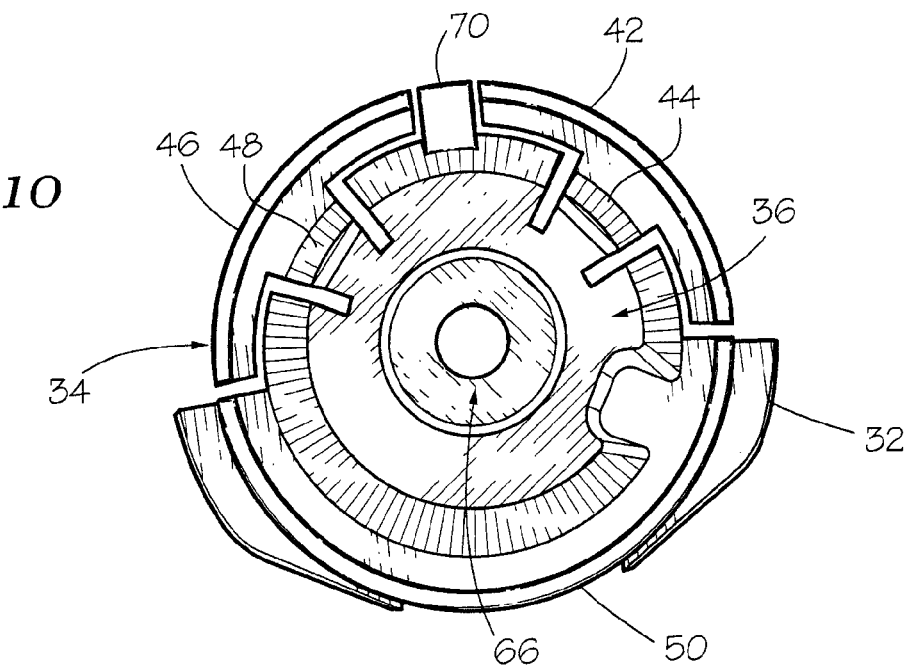
FIG. 10 shows a bottom view of the pivot cylinder according to the present invention.
Figure 11:
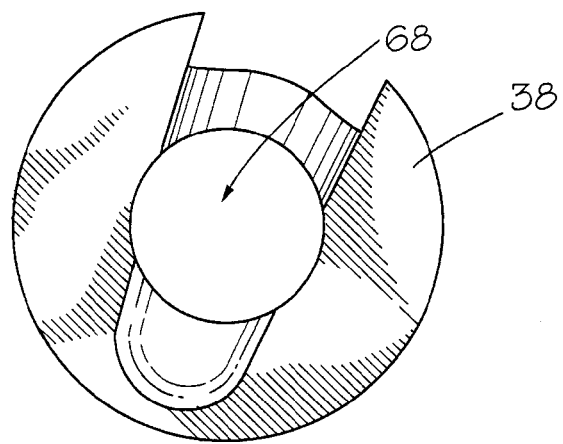
FIG. 11 shows a top view of the inner cone according to the present invention.
Figure 12:
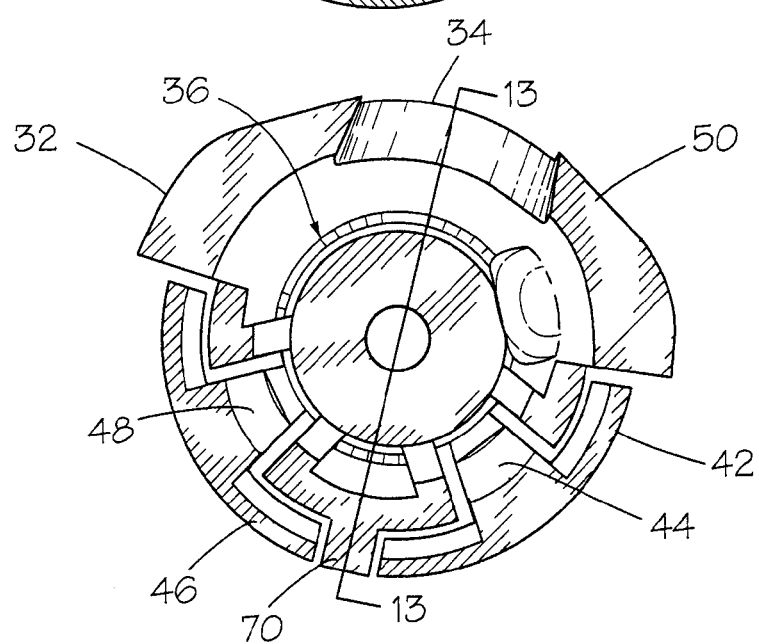
FIG. 12 shows a top view of the pivot cylinder according to the present invention.

Referring to FIGS. 8 and 10, in the illustrated embodiment, pivot cylinder 32 includes an indexing block 70 projecting from a side of pivot cylinder 32. With further reference to FIG. 2, indexing block 70 is received into an indexing slot 72 of lower pivot block 56 on support arm 14 for interconnecting pivot cylinder 32 and support arm 14 so that rotation of support arm 14 causes rotation of pivot cylinder 32 on bearing ring 24 and resists rotation of pivot cylinder 32 on guide post 64 in lower pivot block 56.

Referring to FIGS. 2, 3, 14 and 15, a spring sleeve 74 is carried in interior channel 22 of bearing housing 20. Biasing element 40, which in the illustrated embodiment is a coil spring, is generally enclosed within spring sleeve 74 to maintain coil spring 40 in position and to prevent interference with wiring through carrier base 12 and support arm 14. Accordingly, a first spring end, designated generally as 76, biases against spring sleeve 74. A second spring end, designated generally as 78, biases against a top side of inner cone 38.

In a preferred illustrated embodiment, spring sleeve 74 further includes a wiring harness mount 80 adapted for interconnecting with a wiring harness 82 to support electrical wires routed through carrier base 12. Wiring harness 82 commonly includes an attachment prong or clip 84 which is received into harness mount opening 86 to secure wiring harness 82 on harness mount 80.

Figure 15:
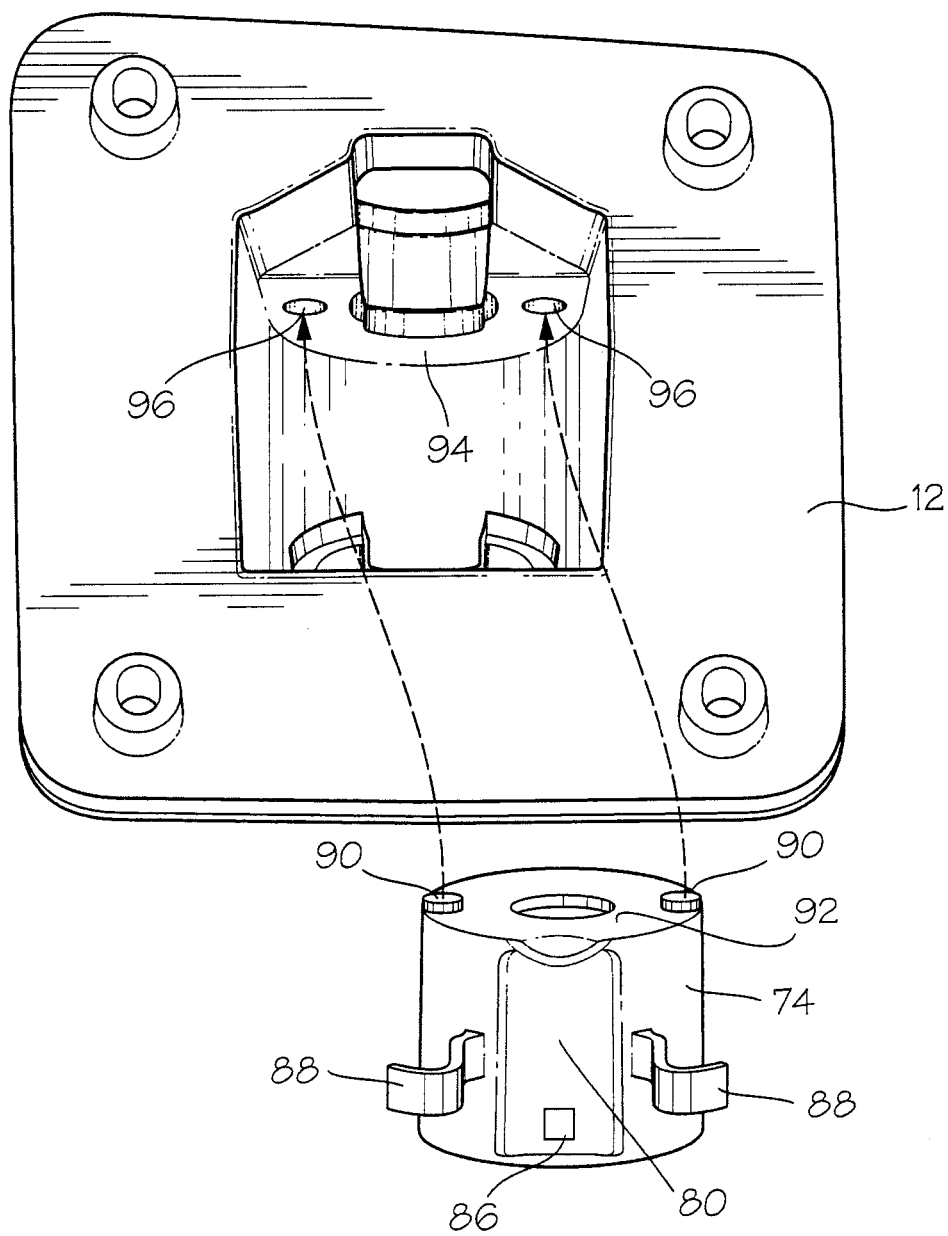

Referring to FIGS. 2, 3 and 15, spring sleeve 74 may further include stabilizing arms 88 for spacing and positioning spring sleeve 74 within interior channel 22 of bearing housing 20. Also, to resist rotation of spring sleeve 74 within interior channel 22, a pair of prongs 90 extend from a top side 92 of spring sleeve 74 and engage complementary prong recesses 96 in an upper flange 94 within interior channel 22 to resist rotation of spring sleeve 74.

Referring to FIGS. 2, 3 and 14, base detent ring 62 includes a mounting flange 98 disposed generally around a perimeter of base detent ring 62 for being seated into bearing housing 20. Accordingly, as shown in FIGS. 2 and 14, bearing housing 20 includes a mounting flange recess 100 receiving mounting flange 98 generally at a distal end of interior channel 22 for positioning base detent ring 62 on bearing housing 20. Additionally, referring to FIGS. 2 and 3, a pair of connecting blocks 102 project from a bottom side of base detent ring 62 for being received into a complementary block receiving channel 104 in upper flange 94 of interior channel 22 for interconnecting base detent ring 62 and bearing housing 20 and to resist rotation of base detent ring 62 on the bearing housing. Alternatively, base detent ring 62 may be molded into bearing housing 20 as opposed to being a separate component as shown in the illustrated embodiment.

Referring to FIGS. 3 and 14, to facilitate wiring of mirror head 16, a continuous wiring passage extends through carrier base 12 and into support arm 14. The continuous wiring passage is defined by a primary opening 106 disposed in a back side of carrier base 12 that extends into interior channel 22 of bearing housing 20. Further, a wiring gap, designated generally as 108, is disposed between a bottom side 110 of base detent ring 62 and top side 92 of spring sleeve 74 in open communication with primary opening 106. Next, a base detent ring opening, designated generally as 112 extends from wiring gap 108 into an arm detent ring opening 114. Finally, a support arm interior channel 116 is in open communication with arm detent ring opening 114 to receive electrical wiring for the mirror head.

While a preferred embodiment of the invention has been described using specific terms, such description is for illustrative purposes only, and it is to be understood that changes and variations may be made without departing from the spirit or scope of the following claims.

What is claimed is:

1. A pivoting detent joint for a mirror assembly having a wear compensator, comprising:
   a carrier base for mounting to the vehicle;
   a bearing housing included on said carrier base;
   a bearing ring disposed in an interior channel of said bearing housing;
   a pivot cylinder rotatably carried within said bearing ring, wherein a cylinder wall of said pivot cylinder engages said bearing ring;
   an inner cone slidably carried in a cylinder recess of said pivot cylinder;
   a biasing element disposed in said bearing housing biasing overtop of and engaging said inner cone, wherein said biasing element presses said inner cone into said cylinder recess so that said inner cone forces said cylinder wall laterally outward against said bearing ring; and, a support arm for carrying a mirror head being pivotally mounted to said bearing housing, wherein said support arm includes a lower pivot block receiving and supporting said pivot cylinder in said interior channel, and an upper pivot block having an arm detent ring engaging a base detent ring carried by said bearing housing;

whereby rotation of said support arm causes rotation of said pivot cylinder on said bearing ring and said arm detent ring on said base detent ring to adjust the position of the support arm relative to said carrier base.

2. The pivoting detent joint of claim 1 wherein said bearing ring comprises a flanged sleeve bushing and said bearing housing includes a flange recess receiving the flange of said sleeve bushing generally at a distal end of said interior channel for positioning said sleeve bushing in said interior channel.

3. The pivoting detent joint of claim 1 wherein said biasing element comprises a coil spring.

4. The pivoting detent joint of claim 3 including a spring sleeve carried in said interior channel of said bearing housing, wherein said coil spring is disposed in said spring sleeve and has a first spring end biases against said spring sleeve and a second spring end biased against said inner cone.

5. The pivoting detent joint of claim 4 wherein said spring sleeve includes a wiring harness mount adapted for interconnecting with a wiring harness to support electrical wires routed through said carrier base.

6. The pivoting detent joint of claim 4 wherein said spring sleeve includes at least one prong extending from a top side of said spring sleeve, and wherein said prong engages a complementary prong recess in an upper flange within said interior channel of said bearing housing to resist rotation of said spring sleeve within said interior channel.

7. The pivoting detent joint of claim 1 including a continuous wiring passage extending through said carrier base and into said support arm defined by a primary opening disposed in said carrier base extending into said interior channel of said bearing housing, a wiring gap disposed between a bottom side of said base detent ring and said spring sleeve, a base detent ring opening, an arm detent ring opening, and a support arm interior channel to receive electrical wiring for said mirror head.

8. The pivoting detent joint of claim 1 wherein said base detent ring includes a mounting flange disposed generally around a perimeter of said base detent ring, and wherein said bearing housing includes a mounting flange recess receiving said mounting flange generally at a distal end of said interior channel for positioning said base detent ring on said bearing housing.

9. The pivoting detent joint of claim 1 including a connecting block projecting from a bottom side of said base detent ring being received into a complementary block receiving channel in an upper flange of said interior channel for interconnecting said base detent ring and said bearing housing.

10. The pivoting detent joint of claim 1 wherein said arm detent ring and said base detent ring are defined by a series of cooperating grooves and ridges that interlock to position said support arm relative to said carrier base.

11. The pivoting detent joint of claim 1 including a first cylinder wall portion of said pivot cylinder carried on a first flexible arm, wherein said inner cone biases said first cylinder wall portion and said first flexible arm outwardly to force said first cylinder wall portion against said bearing ring to compensate for wear of said pivot cylinder against said bearing ring.

12. The pivoting detent joint of claim 11 including a second cylinder wall portion of said pivot cylinder carried on a second flexible arm, wherein said first and second cylinder wall portions define approximately a first half of the circumference of said pivot cylinder, and the remaining second half comprises a rigid cylinder wall portion engaging said bearing ring.

13. The pivoting detent joint of claim 11 wherein said inner cone includes an indexing slot receiving said first flexible arm when inserted into said cylinder recess to align and resist rotation of said inner cone in said pivot cylinder.

14. The pivoting detent joint of claim 1 wherein said lower pivot block of said support arm includes a guide post and said pivot cylinder includes a guide channel receiving said guide post.

15. The pivoting detent joint of claim 1 wherein said pivot cylinder includes an indexing block projecting from a side of said pivot cylinder, wherein said indexing block is received into an indexing slot of said lower pivot block on support arm so that rotation of support arm causes rotation of pivot cylinder on said bearing ring and resists rotation of said pivot cylinder on said lower pivot block.

16. A wear compensator for a pivoting joint of a mirror assembly, comprising:

a carrier base having a bearing housing;
a bearing ring carried by said bearing housing;
a pivot cylinder disposed; within said bearing ring, wherein said pivot cylinder includes a first flexible arm with a first cylinder wall portion mounted to said first flexible arm so that said first cylinder wall portion engages an interior side surface of said bearing ring;
an inner cone slidably carried in a cylinder recess of said pivot cylinder; and,
a biasing element disposed in said bearing housing biasing said inner cone into said cylinder recess, wherein said inner cone continually forces said first cylinder wall portion and said first flexible arm laterally outward against said bearing ring to compensate for wear of said pivot cylinder against said bearing ring.

17. The wear compensator of claim 16 wherein said biasing element includes a coil spring, and wherein a spring sleeve is carried in an interior channel of said bearing housing with said coil spring disposed in said spring sleeve so that a first spring end biases against said spring sleeve and a second spring end biased against said inner cone.

18. The wear compensator of claim 16 including a second cylinder wall portion of said pivot cylinder carried on a second flexible arm, wherein said first and second cylinder wall portions define approximately a first half of the circumference of said pivot cylinder, and the remaining second half comprises a rigid cylinder wall portion for engaging said bearing ring.

19. The wear compensator of claim 16 wherein said inner cone includes an indexing slot receiving said first flexible arm when inserted into said cylinder recess to align and resist rotation of said inner cone in said pivot cylinder.

20. The wear compensator of claim 16 wherein said bearing ring comprises a flanged sleeve bushing and said bearing housing includes a flange recess receiving the flange of said sleeve bushing generally at a distal end of an interior channel of said bearing housing for positioning said sleeve bushing in said interior channel.

* * * * *